(12) United States Patent
Yamamoto

(10) Patent No.: US 8,750,700 B2
(45) Date of Patent: Jun. 10, 2014

(54) CAMERA

(75) Inventor: Hideaki Yamamoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 116 days.

(21) Appl. No.: 13/246,322

(22) Filed: Sep. 27, 2011

(65) Prior Publication Data

US 2012/0082443 A1    Apr. 5, 2012

(30) Foreign Application Priority Data

Oct. 4, 2010   (JP) .................................. 2010-224467
Sep. 6, 2011   (JP) .................................. 2011-193727

(51) Int. Cl.
*G02B 7/28*   (2006.01)

(52) U.S. Cl.
USPC ........................................................ 396/111

(58) Field of Classification Search
USPC ........................................................ 396/111
See application file for complete search history.

(56) References Cited

U.S. PATENT DOCUMENTS 4,985,719 A * 1/1991 Tsurukawa et al. ............ 396/529
6,088,537 A * 7/2000 Ohtaka et al. .................... 396/81
2001/0003556 A1 * 6/2001 Ohmura ......................... 396/114
2002/0180880 A1 * 12/2002 Bean et al. ..................... 348/335
2004/0017501 A1 * 1/2004 Asaga et al. ................... 348/340

FOREIGN PATENT DOCUMENTS

JP         59-107312     6/1984
JP         2757387       3/1990

* cited by examiner

*Primary Examiner* — Clayton E Laballe
*Assistant Examiner* — Dennis Hancock
(74) *Attorney, Agent, or Firm* — Cowan, Liebowitz & Latman, P.C.

(57) ABSTRACT

The camera includes a field lens into which light from the image taking optical system enters, a conductive lens holding member holding the field lens, a conductive member electrically connected with the lens holding member, a secondary image-forming lens causing the light from the field lens to form plural optical images, a light-receiving element converting the plural optical images into electric signals, a focus detection part detecting a focus state of the image taking optical system by using the electric signals, and a conductive camera chassis. A coating having a light transmissive property and a conductive property is provided on an entrance surface of the field lens. The coating is electrically connected with the camera chassis through the conductive member and the lens holding member.

6 Claims, 5 Drawing Sheets

CAMERA

BACKGROUND OF THE INVENTION

1. Field of the Invention

The present invention relates to a camera provided with a focus detection unit, such as a single lens reflex camera, particularly to a camera having a function of preventing foreign substances from adhering to a field lens included in an optical system of the focus detection unit.

2. Description of the Related Art

Single lens reflex cameras are provided with a focus detection unit that detects a focus state of an image taking optical system. The focus detection unit has, as disclosed in Japanese Patent Laid-Open No. 59-107312, a focus detection optical system including a field lens that divides a light flux from the image taking optical system into two light fluxes, and a secondary image-forming lens that causes the two light fluxes to reform paired optical images (object images). The focus detection unit converts the paired object images into electric signals (image signals) by a light-receiving element, and detects the focus state of the image taking optical system on the basis of a phase difference of the paired image signals.

The field lens is disposed at a primary image-forming surface of the image taking optical system or at the vicinity thereof, and is exposed to an outside of the camera through a mount to which an interchangeable image taking optical system (interchangeable lens) is detachably attachable. Adhesion of foreign substances, which enter into a camera body through the mount, to a lens surface (entrance surface) of the field lens causes images of the foreign substances to overlap the object images on the light-receiving element. Such overlap of the foreign substances on the object images makes it impossible to acquire normal image signals, which deteriorates focus detection accuracy.

Japanese Patent No. 2757387 discloses a camera that relatively moves an optical element (optical filter) included in a focus detection optical system and a brush to remove foreign substances adhering on the optical element.

However, the configuration disclosed in Japanese Patent No. 2757387 in which the optical element and the brush are relatively moved to remove the foreign substances adhering on the optical element needs a space where the optical element or the brush is moved and a driving mechanism that drives the optical element or the brush is placed, which increases the size of the camera.

SUMMARY OF THE INVENTION

The present invention provides a camera capable of suppressing adhesion of the foreign substances to the field lens included in the focus detection optical system, without increasing the size of the camera.

The present invention provides as an aspect thereof a camera that includes a field lens disposed in an primary image-forming area of an image taking optical system and into which light from the image taking optical system enters, a lens holding member holding the field lens and having a conductive property, a conductive member electrically connected with the lens holding member, a secondary image-forming lens causing the light from the field lens to form plural optical images, a light-receiving element converting the plural optical images into electric signals, a focus detection part configured to detect a focus state of the image taking optical system by using the electric signals, and a camera chassis having a conductive property. A coating having a light transmissive property and a conductive property is provided on an entrance surface of the field lens, and the coating is electrically connected with the camera chassis through the conductive member and the lens holding member.

Further features of the present invention will become apparent from the following description of exemplary embodiments (with reference to the attached drawings).

DESCRIPTION OF THE PREFERRED EMBODIMENTS

Exemplary embodiments of the present invention will hereinafter be described with reference to the accompanying drawings.

Embodiment 1

Figure 1:
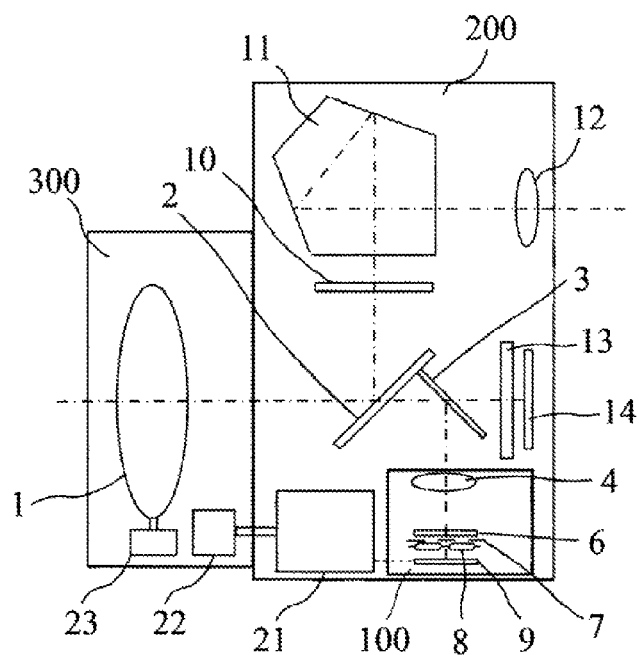
FIG. 1 shows the configuration of a single lens reflex camera that is Embodiment 1 of the present invention.

FIG. 1 shows the configuration of a single lens reflex camera that is a first embodiment (Embodiment 1) of the present invention. In FIG. 1, reference numeral 200 denotes a mirror box as a camera chassis. Reference numeral 300 denotes an interchangeable lens that is detachably attachable to a mount (not shown) fixed to the mirror box 200. The interchangeable lens 300 includes an image taking lens (image taking optical system) 1.

In the camera, reference numeral 2 denotes a quick-return mirror, and reference numeral 3 denotes a sub-mirror. Reference numeral 100 denotes a focus detection unit.

Reference numeral 10 denotes a focal plane plate, and reference numeral 11 denotes a penta-dach prism for forming an erected image. Reference numeral 12 denotes an eyepiece lens. The focal plane plate 10, the penta-dach prism 11 and the eyepiece lens 12 constitute a viewfinder optical system.

Reference numeral 14 denotes an image sensor (image pickup element) that is constituted by a photoelectric conversion element such as a CCD sensor or a CMOS sensor. The image sensor 14 photoelectrically converts an object image formed by the image taking lens 1 to output an electric signal to be used for producing an image (image data). Reference numeral 21 denotes a camera CPU serving as a controller that performs various calculation and controls various operations in the camera.

In the interchangeable lens 300, reference numeral 22 denotes a memory in which various information on the interchangeable lens 300 is stored. Reference numeral 23 denotes a focus motor that moves a focus lens (not shown) included in the image taking lens 1 in an optical axis direction to perform focusing of the image taking lens 1. Drive of the focus motor 23, that is, the focusing is controlled by the camera CPU 21.

Figure 7:
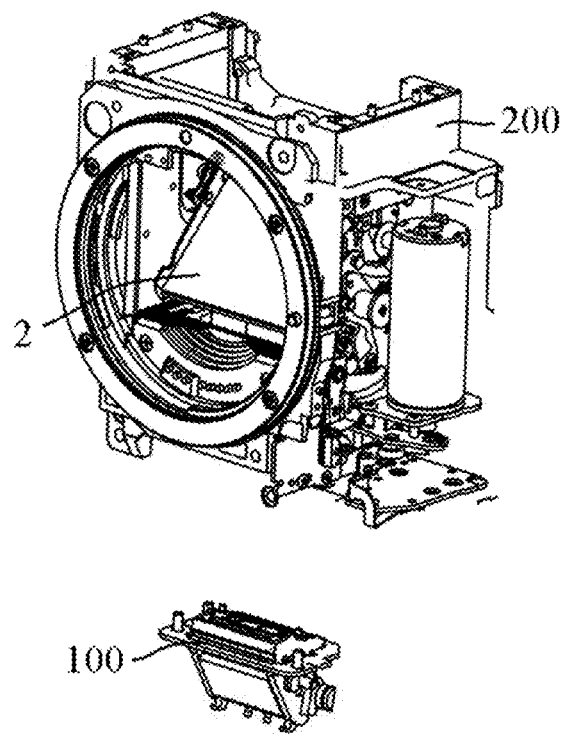
FIG. 7 is an exploded perspective view of a mirror box and the focus detection unit.

FIG. 7 shows an assembling relationship between the mirror box 200 and the focus detection unit 100. Although detailed description will be made later, the focus detection unit 100 is mechanically joined and electrically connected to a lower part of the mirror box 200 with screws each having a conductive property. The mirror box 200 supports various components in the camera, such as the focus detection unit 100, am image sensor unit including the image sensor 14 and the viewfinder optical system.

The mirror box 200 is electrically connected to a ground wiring formed in a substrate on which electric parts such as the camera CPU 21 are mounted, which constitutes a ground of the entire camera. Therefore, the mirror box 200 is formed of a material having a conductive property and a high rigidity, such as a metal or a plastic including carbon.

Next, description will be made of detection of a focus state (hereinafter also referred to as "focus detection") of the image taking lens 1, which is performed by using the focus detection unit 100. Light from an object passes the image taking lens 1 and then reaches the quick-return mirror 2 that is constituted by a half mirror. Part of the light that has reached the quick-return mirror 2 is transmitted therethrough and then reflected by the sub-mirror 3 to enter into a field lens 4 of the focus detection unit 100.

The field lens 4 is disposed in a primary image-forming area of the image taking lens 1 (that is, at a primary image-forming surface of the image taking lens 1 or at the vicinity thereof). Thus, an object image is formed on an entrance surface of the field lens 4 or at the vicinity thereof. In a state where the interchangeable lens 300 is detached from the mount, the entrance surface (lens surfaces) of the field lens is exposed to an outside of the camera through an opening inside the mount. Therefore, foreign substances such as dusts easily adhere to the entrance surface of the field lens 4.

The field lens 4 condenses the light (light flux) entering thereinto. The light flux transmitted through the field lens 4 passes an optical filter 6 such as an infrared cutting filter, and then enters into a secondary image-forming lens 8 through apertures of an aperture stop 7 limiting a light passage area. The function of dividing and limiting the light passage area provided by the aperture stop 7 causes light fluxes passing through two areas (divided pupil areas) in an exit pupil of the image taking lens 1 to enter into the secondary image-forming lens 8. The field lens 4 and the secondary image-forming lens 8 constitute a focus detection optical system.

The secondary image-forming lens 8 causes the two entering light fluxes from the two divided pupil areas to reform object images that are paired optical images on a light-receiving sensor 9 that is a focus detection light-receiving element. The light-receiving sensor 9 photoelectrically converts the paired object images to output paired image signals (electric signals).

The camera CPU 21 constituting a focus detection part performs correlation calculation on the paired image signals to calculate a phase difference, that is, a relative displacement amount between the paired image signals, and then calculates (detects) the focus state (defocus amount) of the image taking lens 1 on the basis of the phase difference. Moreover, the camera CPU 21 calculates, on the basis of the defocus amount, a movement amount by which the focus lens should be moved (in other words, a driving amount of the focus motor 23) for obtaining an in-focus state. Then, the camera CPU 21 drives the focus motor 23 according to the calculation result to move the focus lens. The focusing is thus performed, and thereby an in-focus state is obtained.

On the other hand, light reflected by the quick-return mirror 2 forms an object image on the focal plane plate 10 disposed at a position optically conjugate with the image sensor 14. The light (object image) is diffused by the focal plane plate 10 and transmitted therethrough, and then is converted into an erected image by the penta-dach prism 11. The erected image is expanded by the eyepiece lens 12 to be observed by a user.

The camera CPU 21 retracts, after the focus detection and the focusing are performed, the quick return mirror 2 and the sub-mirror 3 to an outside of an optical path from the image taking lens 1. After the retraction of the mirrors 2 and 3, the light from the image taking lens 1 reaches the image sensor 14 through the optical filter 13 including the infrared cutting filter to form an object image on the image sensor 14. The image sensor 14 photoelectrically converts the object image to output an electric signal. The camera CPU 21 produces an image (image data) on the basis of the electric signal from the image sensor 14, and then records the image in a recording medium (not shown).

Figure 2:
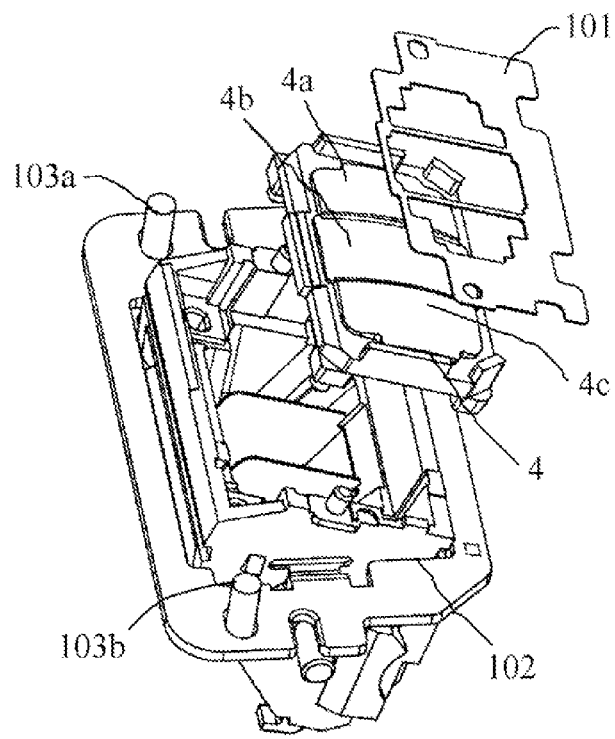
FIG. 2 is an exploded perspective view of a focus detection unit provided in the camera of Embodiment 1.

Next, more detailed description will be made of the focus detection unit 100 with reference to FIGS. 2 to 6. FIG. 2 is an exploded view of the focus detection unit 100. Reference numeral 101 denotes a field mask that is a conductive member, reference numeral 4 denotes the above-described field lens, and reference numeral 102 denotes a field lens holding member.

The light that has entered the focus detection unit 100 passes through the field mask 101, and then enters into the field lens 4. The field mask 101 has a mask function (aperture stop function) of limiting a light passage area such that unnecessary light, that is, light other than the light forming the paired object image may not enter into the field lens 4.

Figure 3:
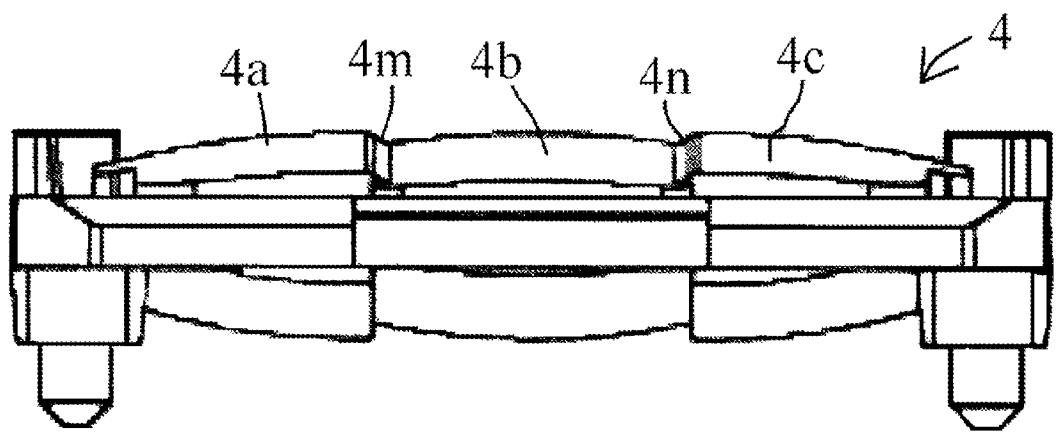
FIG. 3 is a side view of a field lens that is used in the focus detection unit.

As shown in FIG. 3 in which the field lens 4 is viewed from a direction orthogonal to the optical axis direction, the field lens 4 has plural (three in this embodiment) lens surfaces 4a, 4b and 4c. The three lens surfaces 4a, 4b and 4c are provided so as to correspond to three focus detection areas, which are mutually different areas, in an image capturing area where an object image to be captured is formed through the image taking lens 1. In other words, light from one of the focus detection areas enters into the secondary image-forming lens 8 through one of the lens surfaces 4a, 4b and 4c corresponding to the one focus detection area and the aperture stop 7 to form paired optical images (object images) of an object included in the one focus detection area on the light-receiving sensor 9.

The light from the image taking lens 1 (that is, the light reflected by the sub-mirror 3) enters into the field lens 4 from above in FIG. 3 through the three lens surfaces 4a, 4b and 4c. Therefore, the lens surfaces 4a, 4b and 4c are entrance surfaces of the field lens 4.

Figure 4:
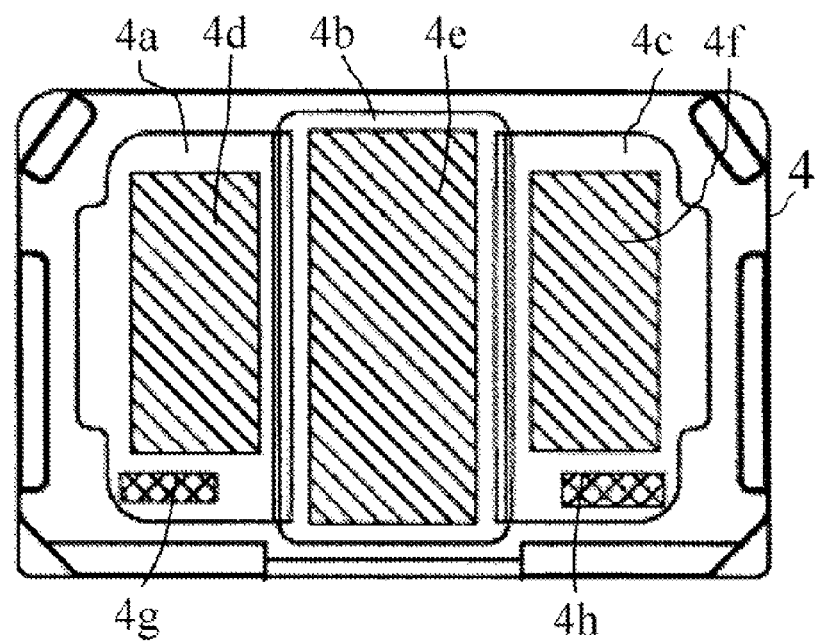
FIG. 4 shows an optical effective area and a contact portion with a conductive member, in the field lens.
Figure 5:
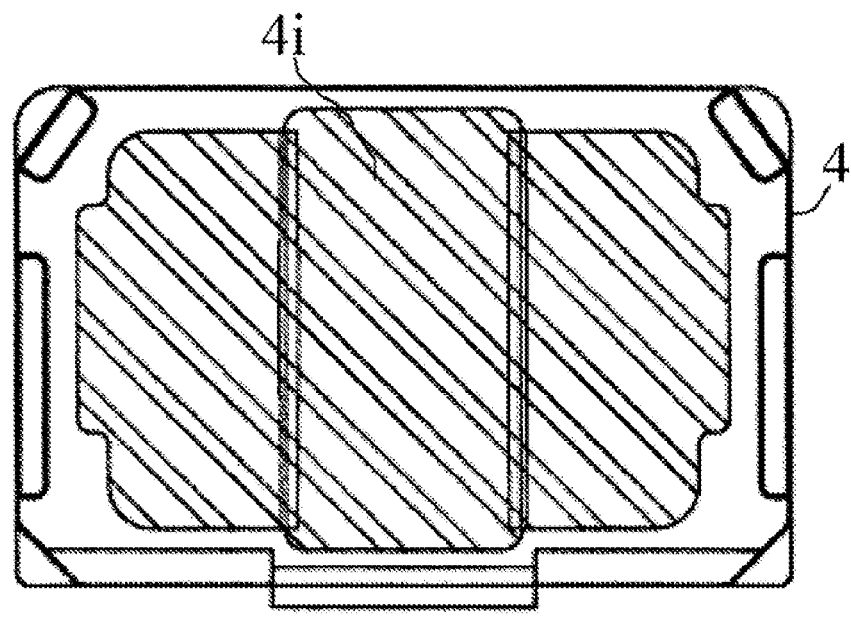
FIG. 5 is a front view showing a coating area on the field lens.

In FIG. 4, hatched areas 4d, 4e and 4f in the lens surfaces 4a, 4b and 4c show optical effective areas through which light fluxes effective for the focus detection pass. In FIG. 5, a hatched area 4i shows a coating area where a coating is provided on the lens surfaces 4a, 4b and 4c.

The coating provided in the coating area 4i is formed by a thin film layer mainly containing a metal oxide having a light transmissive property and a conductive property, such as $SiO_2$ or $TiO_2$. The coating has a function of preventing light reflection (anti-reflection function), and thereby generation of ghost by light reflected on each lens surface is suppressed. Moreover, the coating provides the conductive property to the lens surfaces 4a, 4b and 4c of the field lens 4, which reduces a surface resistance of the field lens 4. The reduction of the surface resistance makes it possible for electric charges on each lens surface to move more easily.

Although this embodiment describes an example of improving the conductive property on the lens surfaces by the coating such as $SiO_2$ or $TiO_2$, which is generally used for improving the light transmissive property of lenses, a coating such as an ITO film for more positively adding the conductive property to the lens surfaces may be provided. Moreover, a coating such as fluorine may be provided on the film of $SiO_2$ or $TiO_2$ to add a function of preventing foreign substance adhesion to the coating while maintaining the light transmissive property and the conductive property. That is, the coating may have at least one of the function of preventing the light reflection and the function of preventing the foreign substance adhesion.

The hatched areas 4g and 4h shown in FIG. 4 are connecting portions of the coating where the coating is brought into contact with the field mask 101 as the conductive member shown in FIG. 2 to be electrically connected therewith. As understood from comparison between the coating area 4i shown in FIG. 5 and the optical effective areas 4d, 4e and 4f shown in FIG. 4, the coating is provided, of the lens surfaces 4a, 4b and 4c, not only in the optical effective areas 4d, 4e and 4f, but also in an outer area outside the optical effective areas 4d, 4e and 4f. The outer area is hereinafter referred to as a "non-optical effective area".

The connecting portions 4g and 4h are provided, of the coating area 4i, not in the optical effective areas 4d, 4e and 4f, but in the non-optical effective area. Therefore, the connecting portions 4g and 4h do not impede formation of the object image through the optical effective areas 4d, 4e and 4f.

Although this embodiment has described the case where the connecting portions 4g and 4h are provided in the non-optical effective area of the lens surfaces 4a and 4c, the connecting portions may be provided in a non-optical effective area, which is outside the optical effective area, of a non-lens surface of the field lens 4 other than the lens surface, as long as the non-lens surface is included in the coating area.

Moreover, as shown in FIG. 3, the field lens 4 has a shape in which smooth inclined surfaces (that is, surfaces inclined with respect to a vertical plane along the optical axis direction) 4m and 4n connect boundary portions of the three lens surfaces 4a, 4b and 4c. Specifically, the inclined surface 4m smoothly connects the lens surface 4a and the lens surface 4b, and the inclined surface 4n smoothly connects the lens surface 4b and the lens surface 4c. Such a shape of the field lens 4 allows the coating provided on the three lens surfaces 4a, 4b and 4c to continue at the boundary portions of the lens surfaces 4a, 4b and 4c, which makes it possible to provide the coating, which is integrally electrically connected, on the three lens surfaces 4a, 4b and 4c. Such a coating configuration can make electric potential of the entire coating provided on the three lens surfaces 4a, 4b and 4c uniform.

Figure 6:
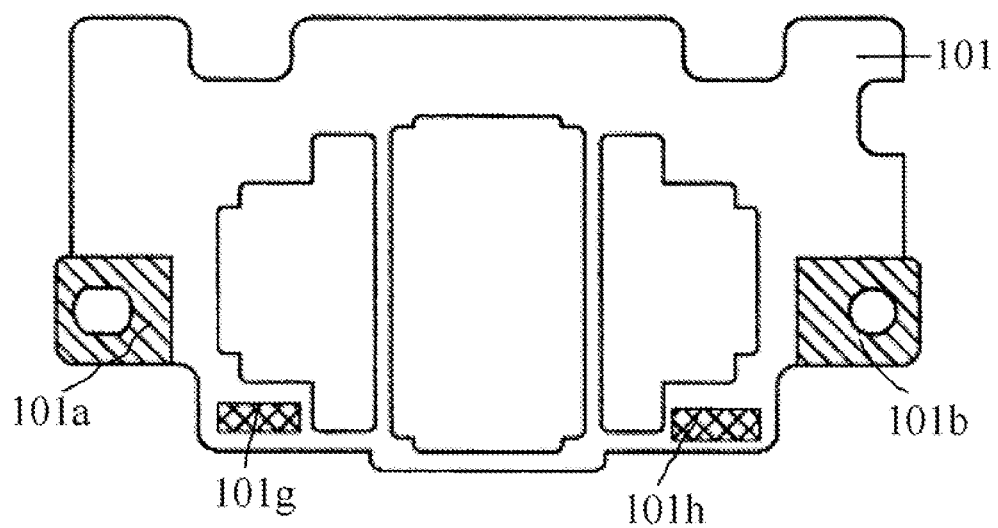
FIG. 6 is a front view of a field mask provided in the focus detection unit.

FIG. 6 shows the field mask 101 that is viewed from the optical axis direction. The field mask 101 is produced of a material having a conductive property, such as iron.

In FIG. 6, hatched areas 101g and 101h of the field mask 101 are areas that are brought into contact with the connecting portions 4g and 4h of the field lens 4 (that is, of the coating). Actually, back faces of the hatched areas 101g and 101h are respectively brought into contact with the connecting portions 4g and 4h.

Moreover, hatched areas 101a and 101b of the field mask 101 are areas that are brought into contact with the field lens holding member 102. Actually, back faces of the hatched areas 101a and 101b are brought into contact with the field lens holding member 102.

In areas of the field mask 101 other than the back faces of the hatched areas 101g, 101h, 101a and 101b, a matte black paint having a light blocking effect and a reflection prevention effect but not having a conductive property is applied. If the paint has a conductive property, the paint may be applied to the entire field mask 101 including the back faces of the hatched areas 101g, 101h, 101a and 101b.

The field lens holding member 102 shown in FIG. 2 constitutes a chassis of the focus detection unit 100, which holds components of the focus detection unit 100, such as the field lens 4 and the secondary image-forming lens 8. The field lens holding member 102 is produced of a material having a conductive property, such as a conductive resin. The field lens holding member 102 is mechanically joined and electrically connected to the mirror box 200 with screws 103a and 103b each having a conductive property.

With the above-described configuration, the conductive coating provided on the lens surfaces 4a, 4b and 4c of the field lens 4 is electrically connected with the mirror box 200 forming the ground, through the field mask 101 that is the conductive member and the field lens holding member 102 having the conductive property. This configuration can suppress adhesion of the foreign substances such as dusts to the lens surfaces 4a, 4b and 4c of the field lens 4 due to static electricity (electric charges) accumulated on the lens surfaces 4a, 4b and 4c, which makes it possible to avoid deterioration of focus detection accuracy caused by images of the foreign substances formed on the light-receiving sensor 9.

Moreover, only providing the coating on substantially one surface of the field lens 4 without forming a complex coating area makes it possible to electrically connect the coating with the mirror box 200 through the field mask, thereby reducing cost for the coating. In addition, such a coating continues at edge portions of the field lens 4 such as the boundary portions of the lens surfaces 4a, 4b and 4c, so that more stable ground connection of the coating with the mirror box 200 can be made.

Moreover, this configuration uses, as the field mask 101 and the field lens holding member 102 that electrically connect the coating with the mirror box 200, members produced by providing a conductive property to a field mask and a field lens holding member that are conventionally used. The use of such field mask 101 and field lens holding member 102 can suppress the adhesion of the foreign substances to the lens surfaces 4a, 4b and 4c without using a brush, a brush driving mechanism and one or more new conductive members, which makes it possible to avoid the deterioration of the focus detection accuracy due to the foreign substances without increasing the size of the camera.

Instead of connecting the boundary portions of the lens surfaces 4a, 4b and 4c of the field lens 4 by the inclined surfaces as described above, the coating may be continued over the lens surfaces 4a, 4b and 4c by increasing the thickness of each part of the coating covering a step between the boundary portions.

Moreover, the number of the lens surfaces of the field lens is not limited to three described above, and may be one, two, four or more.

Embodiment 2

Next, description will be made of a single lens reflex camera that is a second embodiment (Embodiment 2) of the present invention with reference to FIGS. 8 to 10. Although Embodiment 1 has described the case of using the field mask 101 as the conductive member that electrically connects the field lens 4 (that is, the coating) with the field lens holding member 102, this embodiment uses a conductive member not serving as a field mask, such as a conductive tape. The configuration of the camera of this embodiment other than the above-mentioned conductive member is same as that of Embodiment 1, and therefore description thereof will be omitted.

Figure 8:
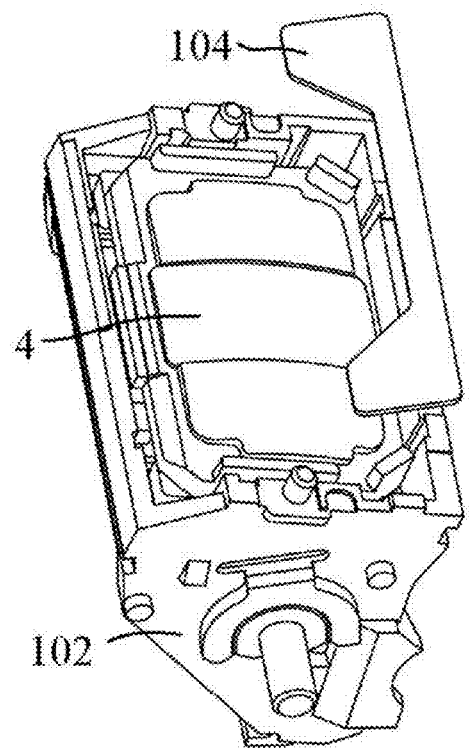
FIG. 8 is an exploded perspective view of a focus detection unit provided in a single lens reflex camera that is Embodiment 2 of the present invention.

FIG. 8 is an exploded view of a focus detection unit 100 in this embodiment. Reference numeral 104 denotes a conductive tape as the conductive member. The conductive tape 104 has a conductive property and an adhesive face. The adhesive face is adhered to a coating provided on the field lens 4 and the field lens holding member 102. The field lens (coating) 4 and the field lens holding member 102 are thus electrically connected with each other through the conductive tape 104.

Figure 9:
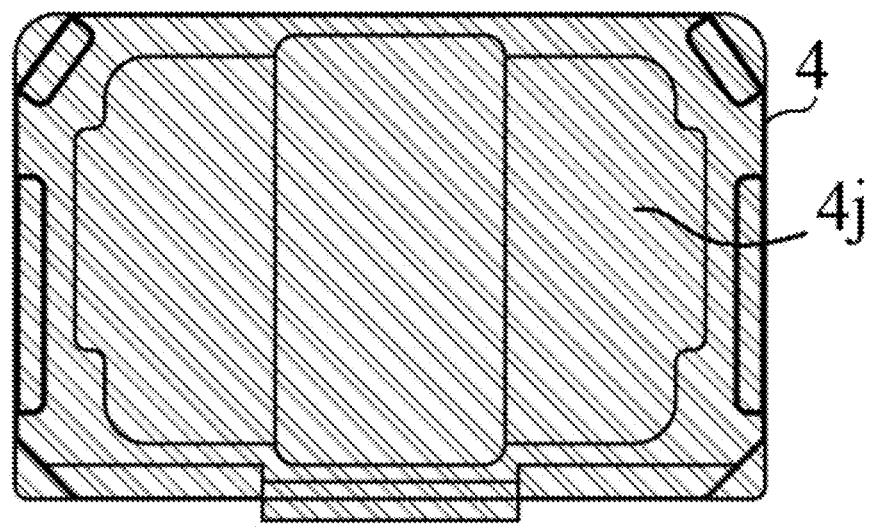
FIG. 9 is a front view showing a coating area on a field lens in Embodiment 2.

In FIG. 9, a hatched area 4j on the field lens 4 shows a coating area where the coating is provided. The configuration of the field lens 4 in this embodiment is different from that in Embodiment 1 only in the coating area 4j. The coating is formed of the same material as that in Embodiment 1, and has the same property as that in Embodiment 1. As well as in Embodiment 1, the coating improves the conductive property and the light transmissive property of the field lens 4. Optical effective areas in lens surfaces of the field lens 4 are also same as those in Embodiment 1.

Figure 10:
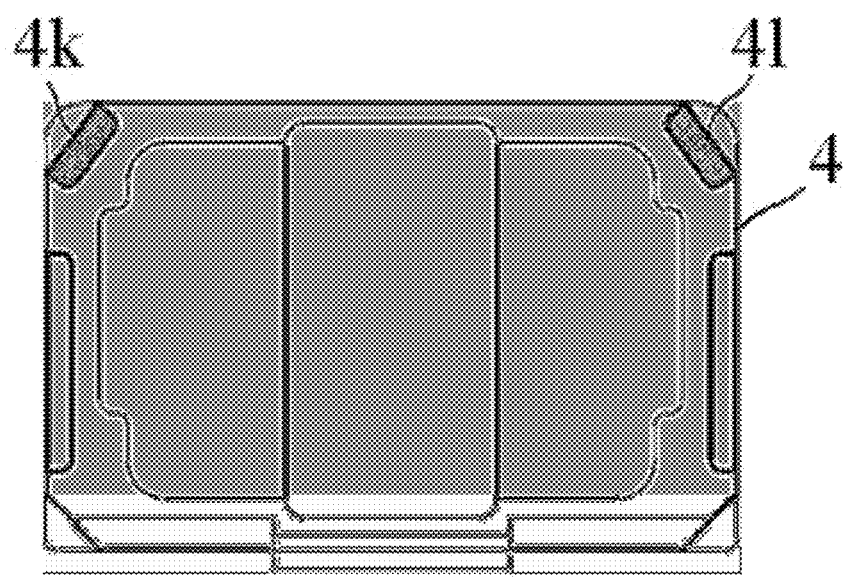
FIG. 10 shows connecting portions where the field lens and a conductive tape are connected with each other.

In FIG. 10, hatched areas 4k and 4l in the coating are connecting portions that are brought into contact with the conductive tape 104 to be electrically connected therewith. The hatched areas 4k and 4l are provided in an outer area (non-optical effective area) outside the optical effective areas. The coating integrally formed is continuously provided in an entire area on the field lens 4 including the hatched areas 4k and 4l that are brought into contact with the conductive tape 104 and the optical effective areas, which can make electric potentials in those areas equal to each other.

With the above-described configuration, the conductive coating provided on the lens surfaces of the field lens 4 is electrically connected with the mirror box 200 forming the ground, through the conductive tape 104 that is the conductive member and the field lens holding member 102 having the conductive property. This configuration can suppress adhesion of foreign substances such as dusts to the lens surfaces of the field lens 4 due to static electricity (electric charges) accumulated on the lens surfaces, which makes it possible to avoid deterioration of focus detection accuracy caused by images of the foreign substances formed on the light-receiving sensor 9.

Moreover, the conductive member is constituted by the conductive tape 104 having the adhesive face, so that the conductive member is more securely joined with the field lens 4 and the field lens holding member 102. This configuration enables, even if vibrations are applied to the camera or there are changes in environment such as temperature and humidity, more stable suppression of the adhesion of the foreign substances to the lens surfaces of the field lens 4.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-224467, filed on Oct. 4, 2010 and No. 2011-193727, filed on Sep. 6, 2011 which are hereby incorporated by reference herein in their entirety.

What is claimed is:

1. A focus detection unit comprising:
   a field lens disposed in an primary image-forming area of an image taking optical system and into which light from the image taking optical system enters;
   a conductive member electrically connected with a lens holding member, wherein the conductive member is connected with the field lens at a first face side of the field lens, wherein the first face side is an entrance surface for light from the image taking lens;
   a lens holding member holding the field lens and having a conductive property, wherein the lens holding member is connected with the field lens at a second face side of the field lens;
   a secondary image-forming lens causing the light from the field lens to form plural optical images;
   a light-receiving element converting the plural optical images into electric signals;
   a focus detection part configured to detect a focus state of the image taking optical system by using the electric signals; and
   a camera chassis having a conductive property,
   wherein a coating having a light transmissive property and a conductive property is provided on the first face side of the field lens, and
   wherein the coating is electrically connected with the camera chassis through the conductive member and the lens holding member.

2. A focus detection unit according to claim 1, wherein the conductive member is a field mask that limits a passage area of the light entering into the field lens.

3. A focus detection unit according to claim 1, wherein the coating is provided in an optical effective area and a non-optical effective area of the entrance surface of the field lens, wherein, in the non-optical effective area, a connecting portion with which the conductive member is electrically connected is formed.

4. A focus detection unit according to claim 1, wherein the coating has at least one of a function of preventing light reflection and a function of preventing foreign substance adhesion.

5. A focus detection unit according to claim 1, wherein the field lens has plural entrance surfaces, and, wherein the coating is provided on the plural entrance surfaces.

6. A camera comprising:
   the focus detection unit according to the claim 1; and
   a focus detection part configured to detect a focus state of the image taking optical system by using the electric signals.

* * * * *